Figure 1:
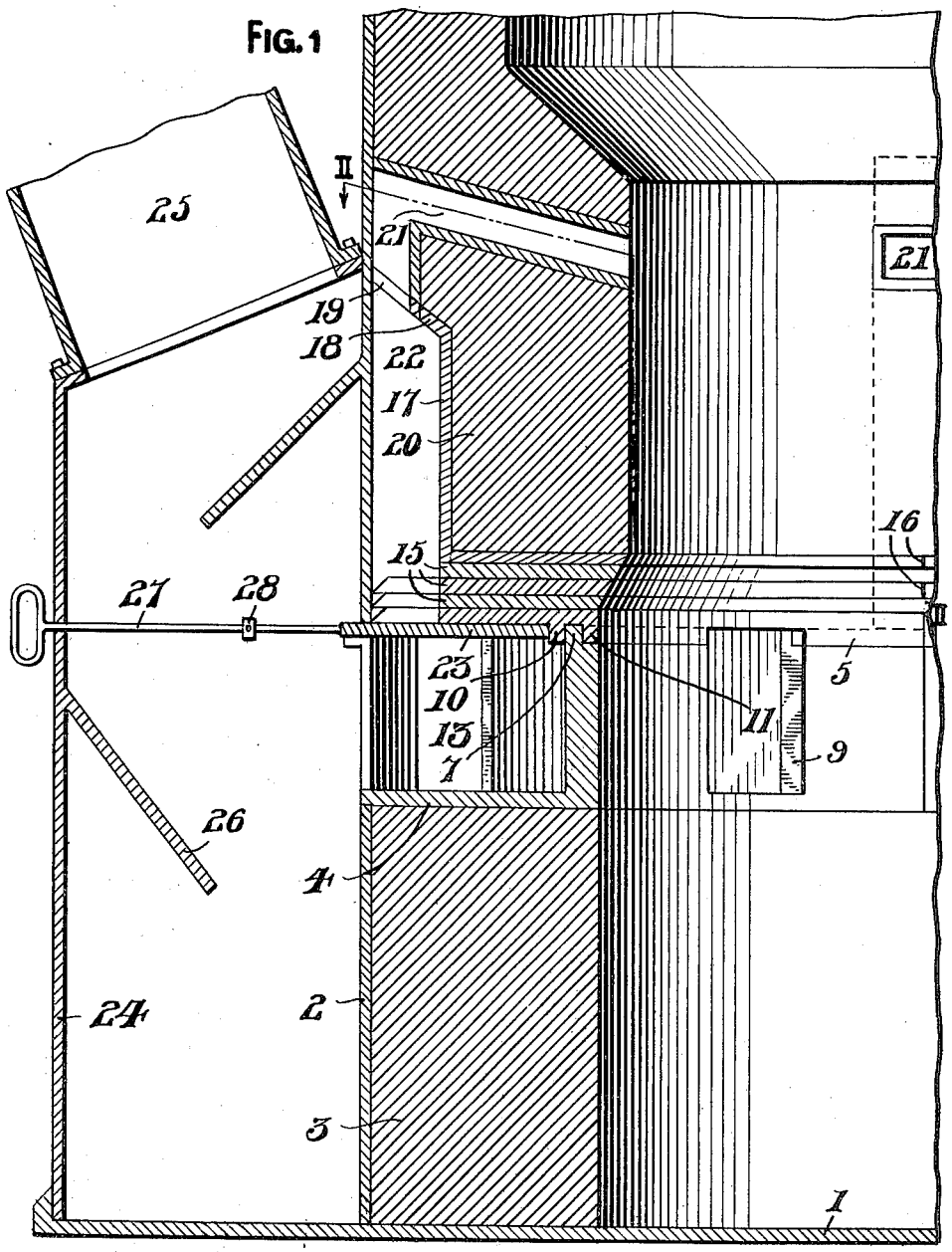

M. ZIPPLER, Jr.
CUPOLA FURNACE.
APPLICATION FILED MAR. 29, 1913.

1,092,623.

Patented Apr. 7, 1914.

3 SHEETS—SHEET 1.

WITNESSES

INVENTOR
M. Zippler, Jr.
By Henry C. Evert
ATTORNEY

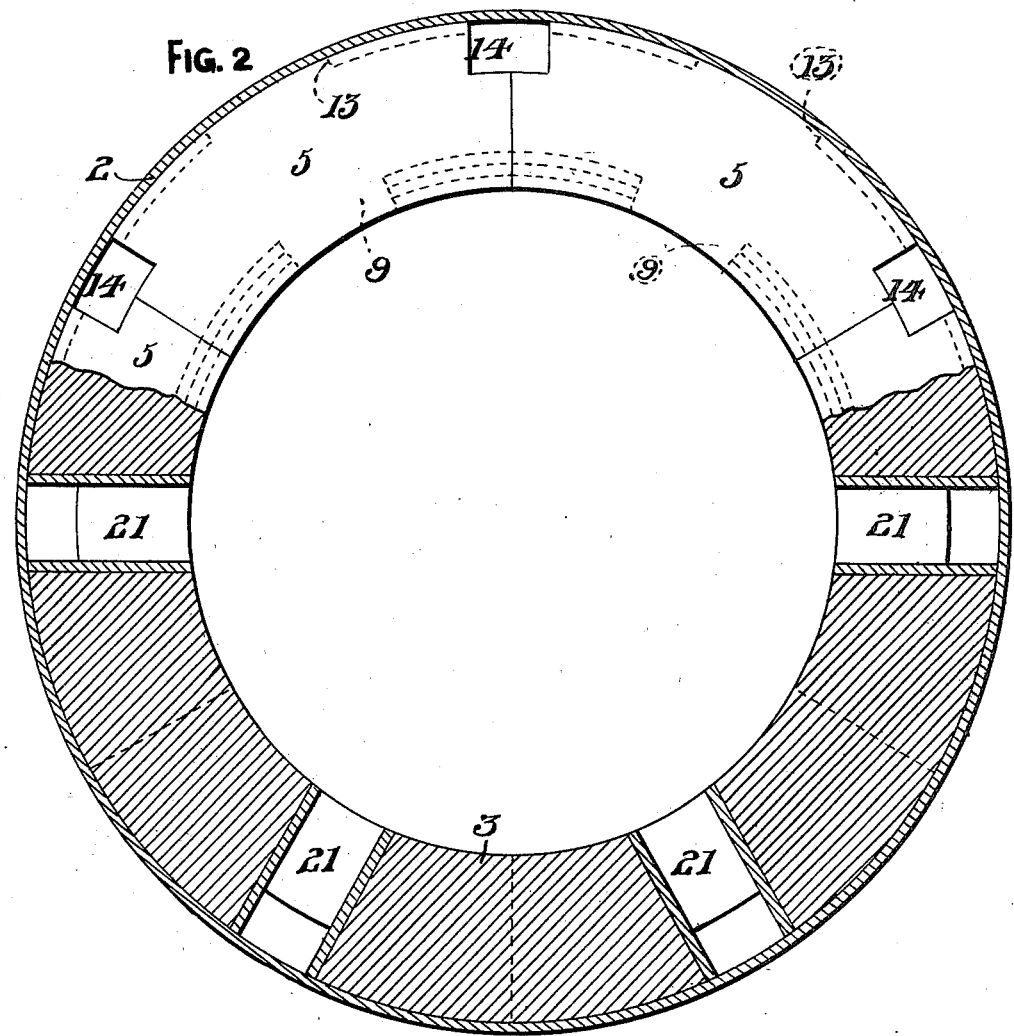
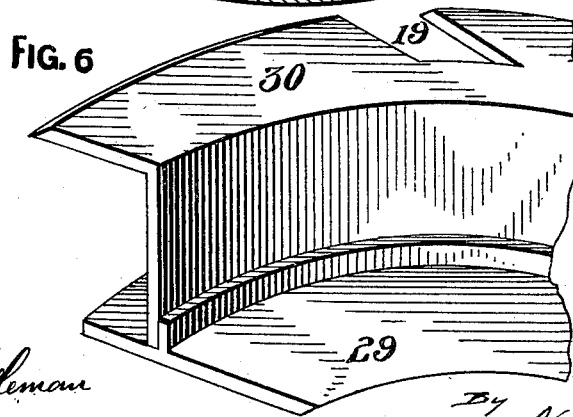

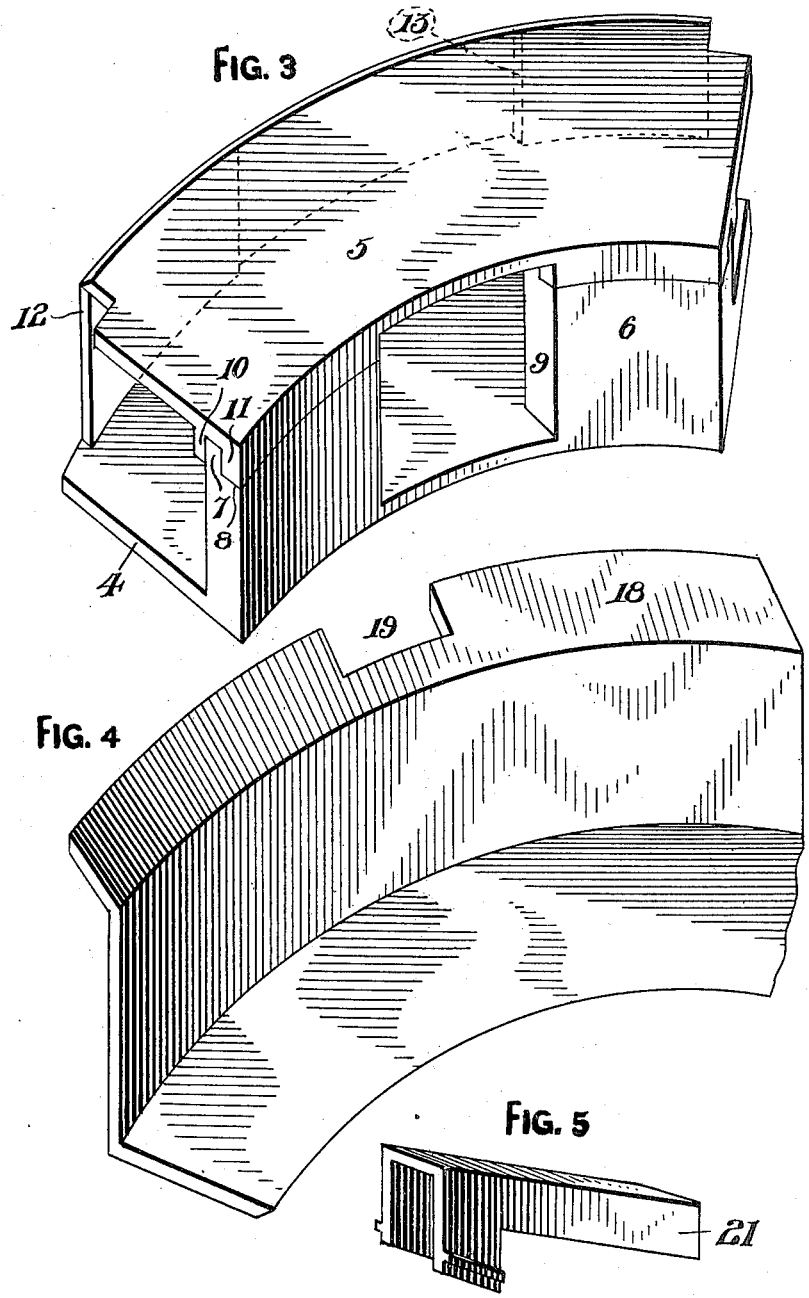

UNITED STATES PATENT OFFICE.

MICHAEL ZIPPLER, JR., OF PITTSBURGH, PENNSYLVANIA.

CUPOLA-FURNACE.

1,092,623.  Specification of Letters Patent.  Patented Apr. 7, 1914.

Application filed March 29, 1913. Serial No. 757,600.

*To all whom it may concern:*

Be it known that I, MICHAEL ZIPPLER, Jr., a citizen of the United States of America, residing at Pittsburgh, in the county of Allegheny and State of Pennsylvania, have invented certain new and useful Improvements in Cupola-Furnaces, of which the following is a specification, reference being had therein to the accompanying drawing.

This is an improvement in connection with the cupola-furnace disclosed in my Patent Number 1,052,875, granted February 11, 1913.

Besides having practically the same objects in view as disclosed in the patent above referred to, the present invention aims to provide:—First, a cupola-furnace wherein air is utilized as a cooling agent and to facilitate combustion within the furnace. Second, a cupola-furnace embodying a lower and upper twyer wherein novel means is resorted to for supplying sufficient air to said twyers to expeditiously melt iron that will produce a clean product, with less fuel, the twyers being constructed whereby air is equally distributed around the furnace, thereby producing a better mixture of iron or semi steel. Third, a cupola-furnace having a chambered and sectional twyer plate, a portion of which is laminated to reduce to a minimum the possibility of said plate being destroyed by a high degree of temperature. Fourth, a cupola-furnace embodying upper and lower twyers, the upper twyers having an overhanging laminated body that prevents the lower twyers from being clogged with iron or slag, thereby insuring a uniform heat which prevails throughout and reduces to a minimum the chances of the brick lining being burned out. Fifth, a cupola-furnace embodying a lower and upper twyer, the upper twyer having air chambers that reduce the air pressure at a point where the same can be shut off, as it is a well known fact that air is not required in the initial heat and that as the heat progresses air can be admitted to the upper twyer to facilitate the melting of the contents of the cupola-furnace. Sixth, a cupola-furnace of novel construction embodying a twyer plate that is applicable to large and small furnaces, the twyer being constructed whereby it cannot buckle or become accidentally displaced due to the intense heat to which it is subjected.

My invention further aims to accomplish the above and other results by the novel construction disclosed in the accompanying drawings, wherein:—

Figure 1 is a vertical sectional view of a portion of a cupola-furnace in accordance with this invention, Fig. 2 is a horizontal sectional view of the same taken on the line II—II of Fig. 1, Fig. 3 is a perspective view of one of the sections of the twyer plate, Fig. 4 is a perspective view of one of the sections of an inner lining forming part of the upper twyer, Fig. 5 is a perspective view of an air conduit of the upper twyer, and Fig. 6 is a perspective view of a portion of a modified form of inner lining intended as a substitute for the inner lining shown in Fig. 4.

In describing my invention by aid of the drawings above referred to, I desire to point out that I intend said views as simply illustrative of an example whereby my invention may be applied in practice, and I do not limit my claims to the precise arrangement and construction of parts indicated. The following description is therefore to be construed broadly as including substitute arrangements and constructions which are the obvious equivalent of those shown.

In the drawings 1 denotes a bed or foundation plate and arranged upon said plate is a cylindrical furnace shell 2 that has a lower inner lining 3 made of bricks or a non-fusible material. This inner lining occupies the lower part of said shell and serves functionally as a support for a sectional twyer plate, each section of said plate being composed of interlocked members, as will presently appear.

For the convenience of illustration and also as an indication of the approximate number of sections that can be used, the twyer plate has been illustrated in Fig. 2 as composed of six sections, and each section is composed of a lower member 4 and an upper member 5. These members are arranged in parallelism and in a horizontal plane. The member 4 has an inner wall 6 that has the upper edge thereof provided with a longitudinal tongue 7 forming a shoulder 8, the purpose of which will presently appear. The wall 6 of the member 4 has a rectangular opening 9, the upper wall of said opening being formed by the upper member 5 of the twyer plate section. The upper member 5 has the inner edge thereof provided with depending longitudinal tongues 10 and 11, the former engaging the inner side of the wall 6 of the lower member and the latter engaging the outer side of the tongue 7 and resting upon the shoulder 8 of said wall. The tongues 10 and 11 form a longitudinal groove to receive the tongue 7 of the wall 6, whereby the upper member 5 cannot become laterally displaced relatively to the lower member 4.

The upper member 5 of the twyer plate section has an outer wall 12 that rests upon the outer edge of the member 4. The wall 12 is provided with an oblong opening 13 and said upper member has the ends thereof, at the wall 12, cut away, whereby when the sections of the twyer plate are fitted together, as shown in Fig. 2, the upper members 5 will have openings 14, as clearly shown in Fig. 2.

Arranged upon the upper members 5 of the twyer plate sections is a laminated overhanging body 15 composed of a plurality of superimposed circular plates having the inner edges thereof beveled and matched, whereby the inner edges of said plates will overhang the twyer plate. The laminated plates of this overhanging body are made up of segment-shaped sections, and the segment-shaped sections of one plate are staggered with relation to the sections of an adjoining plate, whereby the joints between said sections will be alternately arranged, as designated at 16, thus forming an overhanging body that is capable of withstanding a high degree of heat to which it is subjected when the furnace is in operation. By making the overhanging body of laminated or superimposed plates, such plates that are injured or burned out can be easily renewed without necessarily destroying the entire overhanging body.

Arranged upon the laminated overhanging body is a sectional inner lining 17 that is substantially L-shaped in cross section and the upper edges of said inner lining are disposed at an angle, as at 18 and provided with openings 19. The inner lining 17 supports a fire brick or non-fusible lining 20 which forms the wall of an upper twyer. This non-fusible lining can be extended to any height within the furnace and embedded within said lining and in communication with the openings 19 are angularly disposed and equally spaced air conduits 21 adapted to receive air from the annular chamber 22 formed by the lining 17 and the shell 2. The chamber 22 is in communication with the hollow sectional twyer plate through the medium of the openings 14, and in connection with each opening there is a slide damper 23 that controls the passage of air into the annular chamber 22.

Surrounding the shell 2 is an annular housing or wind box 24 that is supported by the bed or foundation plate 1. The housing forms an exterior air chamber and in communication with the top of said housing is a blast pipe 25. The housing and the shell 2 are provided with angularly disposed baffle plates 26 for deflecting air admitted to the housing or box by the blast pipe 25. Extending through the walls of the housing are operating rods 27 that are connected to the dampers 23, whereby said dampers can be opened and closed. The dampers are limited in their opening movement by adjustable collars 28 carried by the operating rods 27.

In operation, the openings 13 of the twyer plate permits of air entering said twyer plate from the housing or wind box 24. This air can pass through the lower twyer openings 9 into the lower portion of the furnace to facilitate combustion therein, for instance, at the initial heat of iron within said furnace. After the heat has progressed sufficiently the dampers 23 can be opened to admit air to the annular interior air chamber 22 and from this chamber the air can pass through the conduits 21 into the furnace above the twyer openings 9. The manner of disposing the air inlet openings is such that a perfect combustion is insured, consequently there is a reduction in the amount of fuel necessary to operate the furnace.

In Fig. 6 of the drawings there is illustrated a modification of the inner lining 17, which is constructed in two parts 29 and 30, the part 30 having the upper edge thereof disposed in a horizontal plane instead of the angle edge 18 of the lining shown in Fig. 4. This form of lining can be used to an advantage and supported directly upon the laminated body interposed between the lower and upper twyer chambers.

What I claim is:—

1. In a cupola furnace an annular twyer plate formed of two L-shaped sections oppositely disposed with respect to each other thereby providing a continuous annular air chamber, the vertical portion of one of said sections provided with openings to constitute air inlets and the vertical portion of the other of said sections provided with openings to constitute outlets.

2. In a cupola furnace an annular twyer plate formed of two L-shaped sections oppositely disposed with respect to each other thereby providing a continuous annular air chamber, the vertical portion of one of said sections provided with openings to constitute air inlets and the vertical portion of the other of said sections provided with openings to constitute outlets, the vertical portion provided with outlets being of greater thickness than the vertical portion provided with the inlets.

3. In a cupola furnace, an annular twyer plate forming a continuous annular air chamber and having its inner wall provided with outlets and its outer wall formed with inlets, a laminated body mounted upon the top of said plate, overhanging the inner wall of the air chamber and formed with a series of superposed flat annular metallic members each having its inner edge beveled, the beveled inner edge of an upper member forming a continuation of the beveled inner edge of a lower member, said plate having its top formed with a plurality of openings, said laminated body cut away to provide a continuation of said openings, and means for conducting air from said openings into the furnace at points above said laminated body.

4. In a cupola furnace, an annular twyer plate forming a continuous annular air chamber and having its inner wall provided with outlets and its outer wall formed with inlets, a laminated body mounted upon the top of said plate, overhanging the inner wall of the air chamber and formed with a series of superposed flat annular metallic members each having its inner edge beveled, the beveled inner edge of an upper member forming a continuation of the beveled inner edge of a lower member, said plate having its top formed with a plurality of openings, said laminated body cut away to provide a continuation of said openings, means for conducting air from said openings into the furnace at points above said laminated body, and dampers for controlling the openings in the top of said air chamber.

5. In a cupola furnace an annular hollow twyer plate forming a continuous annular air chamber having the inner wall integral with the bottom and the outer wall integral with the top, said inner wall provided with outlets and said outer wall with inlets, said air chamber being uninterrupted throughout.

6. In a cupola furnace an annular hollow twyer plate forming a continuous annular air chamber having the inner wall integral with the bottom and the outer wall integral with the top, said inner wall provided with outlets and said outer wall with inlets, said air chamber being uninterrupted throughout, and an annular laminated body formed of a series of plates overhanging the front wall of said air chamber.

7. In a cupola furnace, an annular hollow twyer plate forming a continuous annular air chamber having the inner wall integral with the bottom and the outer wall integral with the top, said inner wall provided with outlets and said outer wall with inlets, said air chamber being uninterrupted throughout, the top wall of said chamber provided with openings for the discharge of air, means for conducting such air into the furnace above said outlets, and a damper for controlling said openings.

8. In a cupola furnace, an annular hollow twyer plate forming a continuous annular air chamber having the inner wall thereof provided with outlets and the outer wall with inlets, said air chamber being uninterrupted throughout, and a wind box surrounding said plate and provided with means for deflecting the air to said inlets.

9. In a cupola furnace, an annular hollow twyer plate formed of a pair of oppositely disposed angle-shaped sections, each consisting of a plurality of segment-shaped members, the vertical portion of one of said sections extending into the horizontal portion of the other of said sections, said sections providing a continuous uninterrupted annular air chamber, the inner wall of said chamber being flush with the lower inner lining of the furnace, the outer wall of said chamber provided with inlets and the inner wall of said chamber formed with outlets.

10. In a cupola furnace an annular twyer plate forming a continuous annular air chamber having its inner wall provided with outlets and its outer wall formed with inlets, a protective device mounted upon and overhanging the inner wall of the air chamber, said plate having its top formed with a plurality of openings, said device cut away to provide continuations of said openings, a continuous annular air chamber arranged above said device and communicating with the first mentioned chamber through said openings, and means to provide upper twyers arranged above and communicating with said upper chamber and opening into the furnace above said outlets.

11. In a cupola furnace an annular twyer plate forming a continuous annular air chamber having its inner wall provided with outlets and its outer wall formed with inlets, a protective device mounted upon and overhanging the inner wall of the air chamber, said plate having its top formed with a plurality of openings, said device cut away to provide continuations of said openings, a continuous annular air chamber arranged above said device and communicating with the first mentioned chamber through said openings, means to provide upper twyers arranged above and communicating with said upper chamber and opening into the furnace above said outlets, and means for controlling the supply of air from the lower to the upper chamber.

12. In a cupola furnace an annular twyer plate forming a continuous annular air chamber having its inner wall provided with outlets and its outer wall formed with inlets, a protective device mounted upon and overhanging the inner wall of the air chamber, said plate having its top formed with a plurality of openings, said device cut away to provide continuations of said openings, a continuous annular air chamber arranged above said device and communicating with the first mentioned chamber through said openings, means to provide upper twyers arranged above and communicating with said upper chamber and opening into the furnace above said outlets, means for controlling the supply of air from the lower to the upper chamber, and a wind box surrounding said lower chamber and provided with means for deflecting air to said inlets.

13. In a cupola furnace, an upper and a lower continuous annular air chamber, said lower chamber having its outer side wall provided with inlets and its inner side wall with outlets, means for establishing communication between the upper chamber and the lower chamber, and means to provide a plurality of upper twyers opening into the furnace above said outlets and communicating with said upper chamber.

14. In a cupola furnace, an upper and a lower continuous annular air chamber, said lower chamber having its outer side wall provided with inlets and its inner side wall with outlets, means for establishing communication between the upper chamber and the lower chamber, means to provide a plurality of upper twyers opening into the furnace above said outlets and communicating with said upper chamber, and a wind box surrounding said lower chamber and provided with means for deflecting air to said inlets.

In testimony whereof I affix my signature in the presence of two witnesses.

MICHAEL ZIPPLER, Jr.

Witnesses:
J. P. APPLEMAN,
KATHERINE ERRETT.

---

Copies of this patent may be obtained for five cents each, by addressing the "Commissioner of Patents, Washington, D. C."